United States Patent
Shiba

(10) Patent No.: US 10,761,185 B2
(45) Date of Patent: Sep. 1, 2020

(54) SIGNAL PROCESSING DEVICE, SIGNAL PROCESSING METHOD, RECORDING MEDIUM, TARGET DETECTION DEVICE, AND TARGET DETECTION METHOD

(71) Applicant: NEC Corporation, Minato-ku, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 15/549,422

(22) PCT Filed: Feb. 18, 2016

(86) PCT No.: PCT/JP2016/000878
§ 371 (c)(1),
(2) Date: Aug. 8, 2017

(87) PCT Pub. No.: WO2016/132742
PCT Pub. Date: Aug. 25, 2016

(65) Prior Publication Data
US 2018/0024227 A1    Jan. 25, 2018

(30) Foreign Application Priority Data
Feb. 18, 2015    (JP) .................................. 2015-029224

(51) Int. Cl.
*G01S 7/292*     (2006.01)
*G01S 7/487*     (2006.01)
(Continued)

(52) U.S. Cl.
CPC .............. *G01S 7/292* (2013.01); *G01S 7/487* (2013.01); *G01S 7/52004* (2013.01);
(Continued)

(58) Field of Classification Search
CPC ...... G01S 7/292; G01S 7/487; G01S 7/52004; G01S 7/526; G01S 7/536; G01S 7/354;
(Continued)

(56) References Cited

U.S. PATENT DOCUMENTS

| 4,717,252 A | 1/1988 | Halldorsson et al. |
| 5,970,433 A | 10/1999 | Oka et al. |

(Continued)

FOREIGN PATENT DOCUMENTS

| DE | 19704220 A1 | 8/1998 |
| EP | 1782094 | 5/2007 |

(Continued)

OTHER PUBLICATIONS

International Search Report for PCT Application No. PCT/JP2016/000878, dated May 17, 2016.

(Continued)

*Primary Examiner* — Timothy A Brainard
*Assistant Examiner* — Michael W Justice

(57) ABSTRACT

A signal processing device for processing a signal of a reflected wave which is a wave reflected in a medium and is received by a receiver, when a wave propagating through the medium is continuously transmitted by a transmitter. The signal processing device includes: an estimation unit configured to estimate a lower limit distance of a detection distance range for which an intensity level of a scattered wave from the medium in the detection distance range is equal to or smaller than an allowable level; and a scattering reduction unit configured to remove, from a signal of the reflected wave received, a signal of the scattered wave from the medium in a masking region from the receiver to the lower limit distance to perform output.

9 Claims, 7 Drawing Sheets

(51) Int. Cl.

| | | |
|---|---|---|
| *G01S 7/526* | (2006.01) | |
| *G01S 15/34* | (2006.01) | |
| *G01S 7/536* | (2006.01) | |
| *G01S 7/52* | (2006.01) | |
| *G01S 7/35* | (2006.01) | |
| *G01S 7/493* | (2006.01) | |
| *G01S 13/34* | (2006.01) | |
| *G01S 7/497* | (2006.01) | |
| *G01S 7/40* | (2006.01) | |
| *G01S 17/34* | (2020.01) | |

(52) U.S. Cl.
CPC .............. *G01S 7/526* (2013.01); *G01S 7/536* (2013.01); *G01S 15/34* (2013.01); *G01S 7/354* (2013.01); *G01S 7/4021* (2013.01); *G01S 7/493* (2013.01); *G01S 7/497* (2013.01); *G01S 13/34* (2013.01); *G01S 17/34* (2020.01)

(58) Field of Classification Search
CPC . G01S 7/4021; G01S 7/32; G01S 7/35; G01S 7/40; G01S 7/493; G01S 7/497; G01S 15/32; G01S 13/34; G01S 13/103
See application file for complete search history.

(56) References Cited

U.S. PATENT DOCUMENTS

| | | |
|---|---|---|
| 7,852,709 B1 | 12/2010 | Lerro et al. |
| 2007/0058488 A1 | 3/2007 | Lerro et al. |
| 2009/0323473 A1 | 12/2009 | Tsurugaya et al. |
| 2010/0141928 A1* | 6/2010 | Embry ............... G01N 21/4133 356/5.01 |
| 2011/0002191 A1* | 1/2011 | DeMaio ................ G01S 7/5273 367/1 |
| 2011/0222738 A1 | 9/2011 | Rikimaru et al. |

FOREIGN PATENT DOCUMENTS

| | | |
|---|---|---|
| JP | S63-000283 U1 | 1/1988 |
| JP | H02-238391 A | 9/1990 |
| JP | 2001-174545 A | 6/2001 |
| JP | 2002-181954 A | 6/2002 |
| JP | 3367462 B2 | 1/2003 |
| JP | 2006-098112 A | 4/2006 |
| JP | 2010-008295 A | 1/2010 |
| JP | 2013-088286 A | 5/2013 |
| JP | 2013-124882 A | 6/2013 |
| JP | 2013-178170 A | 9/2013 |
| JP | 2014-089212 A | 5/2014 |
| JP | 2015-017967 A | 1/2015 |
| WO | 2010/055915 A1 | 5/2010 |

OTHER PUBLICATIONS

English translation of Written opinion for PCT Application No. PCT/JP2016/000878.
Canadian Office Action for CA Application No. 2,977,200 dated Feb. 26, 2019.
Japanese Office Action for JP Application No. 2017-500526 dated Nov. 6, 2018 with English Translation.
Extended European Search Report for EP Application No. EP16752131.9 dated Sep. 19, 2018.

* cited by examiner

SIGNAL PROCESSING DEVICE, SIGNAL PROCESSING METHOD, RECORDING MEDIUM, TARGET DETECTION DEVICE, AND TARGET DETECTION METHOD

This application is a National Stage Entry of PCT/JP2016/000878 filed on Feb. 18, 2016, which claims priority from Japanese Patent Application 2015-029224 filed on Feb. 18, 2015, the contents of all of which are incorporated herein by reference, in their entirety.

TECHNICAL FIELD

The disclosed subject matter relates to a technology of detecting a target by using a wave such as a sound wave, a radio wave, or a light wave.

BACKGROUND ART

A target detection device is known example of detecting a target by using a wave such as a sound wave, a radio wave, or a light wave, as in a sonar system, a radar system, or a lidar system. The system uses pulse transmission in which a transmitter transmits a wave, and after a lapse of predetermined time, transmits a wave again. Pulse transmission clarifies at which time point the wave corresponding to a reflected wave from the target is transmitted, and further, can remove influence due to scattering from a medium near the transmitter.

In a case of continuously detecting a target, the transmitter continuously transmits a wave. In this case, in order to determine at which time point the wave corresponding to a reflected wave from the target is transmitted, the transmitter modulates and transmits a wave. In order to reduce influence of scattering from a medium near the transmitter, it is necessary to install a receiver and the transmitter at a predetermined distance apart, as described in PTL 1, or to change a beam shape or a direction of a beam of the transmitter or the receiver by using adaptive beamforming.

However, when the transmitter and the receiver cannot be installed at a predetermined distance apart, influence of the scattering cannot be reduced sufficiently. In some cases, changing a beam shape does not cause to sufficiently reduce influence of the scattering. Further, in a case of changing a direction of a beam, a reflected wave from a target becomes small, and a target cannot be detected.

PTL 2 describes, as a method of avoiding influence of scattering from a medium, a method of separating from the scattering from the medium a reflected wave from a target by using Doppler shifting of a frequency of the reflected wave from the target in a case where the target is moving. PTL 3 describes that a covering state of a ground is recognized based on a difference between two scattered waves produced by reflection of two radio waves having different polarization properties.

Besides, the PTL 4 describes, as a technology of avoiding influence of a scattered wave, a technology of irradiating a ground with a microwave to find correlation between a backward scattering coefficient of a radar image and a vegetation ground. PTL 5 describes a technology of changing transmission electric power of a modulated pulse signal, depending on a distance to a target, in order to avoid a reception signal failure due to a modulated pulse signal. PTL 6 describes a technology of separating a scattered wave from a mixed wave of a progressive wave advancing toward a target in a medium and a forward scattered wave scattered forward from the target, to search for the target. PTL 7 describes a technology of changing reception sensitivity, depending on delay time of reception, to detect a target by using an underground radar.

CITATION LIST

Patent Literature

[PTL 1]: U.S. Pat. No. 7,852,709
[PTL 2]: Japanese Patent No. 3367462
[PTL 3]: Japanese Laid-open Patent Publication No. 2001-174545
[PTL 4]: International Publication No. WO 2010/055915
[PTL 5]: Japanese Laid-open Patent Publication No. 2014-089212
[PTL 6]: Japanese Laid-open Patent Publication No. 2010-008295
[PTL 7]: Japanese Laid-open Patent Publication No. 2006-098112

SUMMARY OF INVENTION

Technical Problem

Reduction in scattering from a medium described in each of PTLs 2 and 3 is however a method taking into account only pulse transmission. The disclosure of the PTLs 4 to 7 does not concern reduction in influence of scattering from a medium in a case of continuously transmitting a wave to detect a target.

An object of the disclosed subject matter is to provide a technology of reducing influence of scattering from a medium in a case of continuously transmitting a wave to detect a target.

Solution to Problem

One aspect of a target detection device according to the disclosed subject matter includes:

a transmitter configured to transmit a wave propagating through a medium;

a receiver configured to receive a reflected wave that comprises the wave reflected in the medium;

a signal processing device configured to estimate a lower limit distance of a detection distance range for which an intensity level of a scattered wave from the medium in the detection distance range is equal to or smaller than an allowable level, and remove, from a signal of the reflected wave received by the receiver, a signal of a scattered wave from the medium in a masking region from the receiver to the lower limit distance to perform output; and a detector configured to detect a target in the medium, based on an output from the signal processing device.

One aspect of a target detection method according to the disclosed subject matter includes:

continuously transmitting a wave propagating through a medium;

receiving a reflected wave that the wave is reflected in the medium;

estimating a lower limit distance of a detection distance range for which an intensity level of a scattered wave from the medium in the detection distance range is equal to or smaller than an allowable level;

removing, from a signal of the reflected wave received, a signal of a scattered wave from the medium in a masking region from a receiver to the lower limit distance to perform output; and detecting a target in the medium, based on the output.

One aspect of a non-transitory computer-readable recording medium according to the disclosed subject matter, the recording medium storing a detection program that causes a computer to execute:

continuously transmitting a wave propagating through a medium;

receiving a reflected wave that the wave is reflected in the medium;

estimating a lower limit distance of a detection distance range for which an intensity level of a scattered wave from the medium in the detection distance range is equal to or smaller than an allowable level;

removing, from a signal of the reflected wave received, a signal of a scattered wave from the medium in a masking region from a receiver to the lower limit distance to perform output; and detecting a target in the medium, based on the output.

One aspect of a signal processing device according to the disclosed subject matter, processes a signal of a reflected wave which is a wave reflected in a medium and is received by a receiver, when a wave propagating through the medium is continuously transmitted from a transmitter.

The signal processing device includes:

an estimation unit configured to estimate a lower limit distance of a detection distance range for which an intensity level of a scattered wave from the medium in the detection distance range is equal to or smaller than an allowable level; and a scattering reduction unit configured to remove, from a signal of the reflected wave received, a signal of the scattered wave from the medium in a masking region from the receiver to the lower limit distance to perform output.

One aspect of a signal processing method according to the disclosed subject matter, the signal processing method for processing a signal of a reflected wave which is a wave reflected in a medium and is received by a receiver, when a wave propagating through the medium is continuously transmitted from a transmitter The signal processing method includes:

estimating a lower limit distance of a detection distance range for which an intensity level of a scattered wave from the medium in the detection distance range is equal to or smaller than an allowable level; and removing, from a signal of the reflected wave received by the receiver, a signal of a scattered wave from the medium in a masking region from the receiver to the lower limit distance.

One aspect of a recording medium according to the subject matter, the recording medium storing a signal processing program of processing a signal of a reflected wave which is a wave reflected in a medium and is received by a receiver, when a wave propagating through the medium is continuously transmitted from a transmitter.

The signal processing program causing a computer to execute:

estimating a lower limit distance of a detection distance range for which an intensity level of a scattered wave from the medium in the detection distance range is equal to or smaller than an allowable level; and removing, from a signal of the reflected wave received by the receiver, a signal of a scattered wave from the medium in a masking region from the receiver to the lower limit distance.

Advantageous Effects of Invention

According to the disclosed subject matter, in a case of continuously transmitting a wave to detect a target, influence of scattering from a medium can be reduced.

DESCRIPTION OF EMBODIMENTS

A signal processing device and a target detection device according to a first example embodiment will be described with reference to FIG. 1. The first example embodiment is an example of the target detection device that detects a target presenting in the water, by using a sound wave, and the signal processing device that is used in the target detection device.

Figure 1:
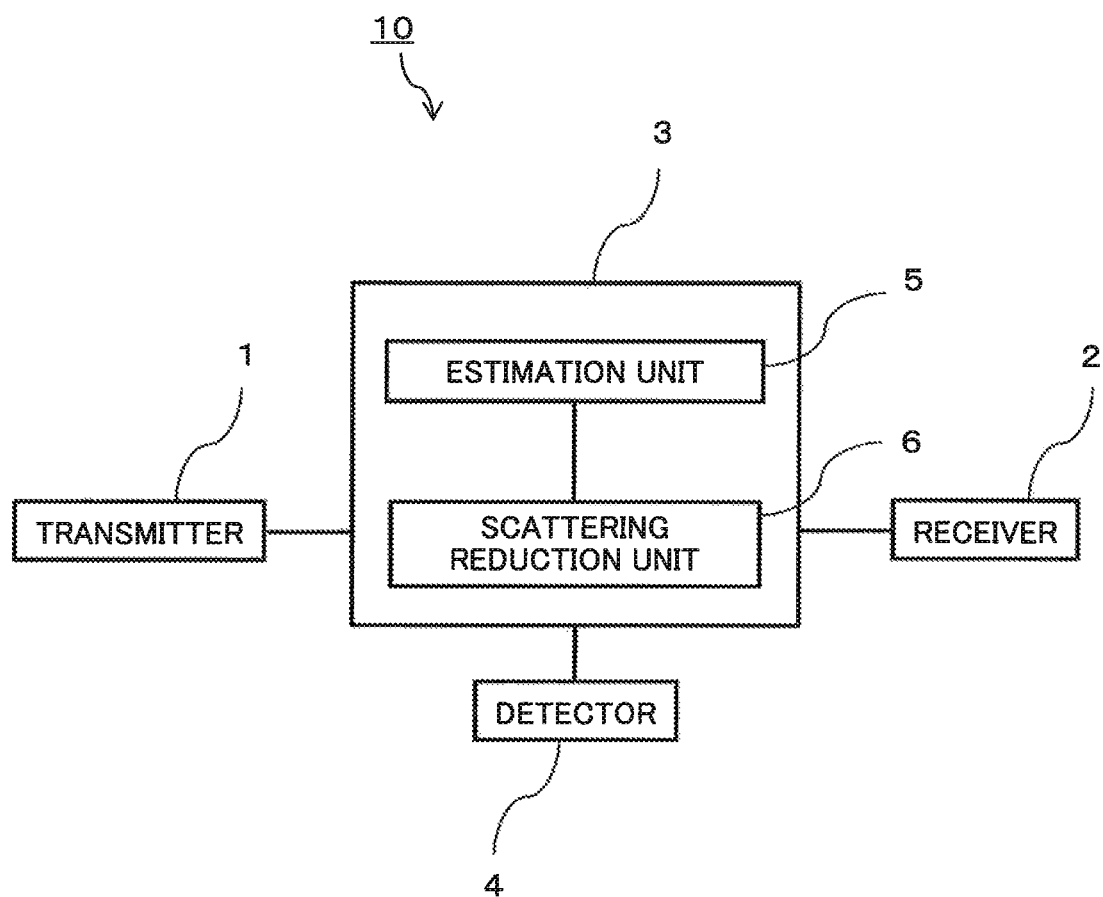
FIG. 1 is a block diagram illustrating a configuration of a signal processing device and a target detection device according to a first example embodiment.

FIG. 1 is a block diagram illustrating a configuration of a signal processing device 3 and a target detection device 10 according to the first example embodiment. The target detection device 10 includes a transmitter 1, a receiver 2, the signal processing device 3, and a detector 4.

The transmitter 1 includes a function of continuously transmitting a sound wave toward a target in the water. The water can be called as a medium in other words. The sound wave can be also called as a wave.

The receiver 2 includes a function of receiving a reflected wave that is a wave reflected in the medium when a sound wave propagates through the water. The reflected wave reflected in the medium includes not only the reflected wave from the target in the medium, but also a scattered wave from the medium.

The signal processing device 3 includes a function of reducing influence of scattering from the medium in a masking region, on an output from the receiver 2 that receives the reflected wave reflected in the medium (including the reflected wave from the target and the scattered wave from the medium). Here, the masking region is included in an area from which the receiver 2 receives a scattered wave from the medium, and is a distance range up to a short distance from the receiver 2 where a scattered wave gives large influence. An example of the distance range from the receiver 2, defining the masking region, is described later along with description of the configuration of the signal processing device 3.

The detector 4 includes a function of detecting the target in the water, based on an output from the signal processing device 3.

A configuration of the above described transmitter 1, receiver 2, and detector 4 is well known as a basic configuration of an active sonar device detecting a target in the water by using a sound wave.

Next, the signal processing device 3 according to the first example embodiment is described in detail. As illustrated in FIG. 1, the signal processing device 3 includes an estimation unit 5 and a scattering reduction unit 6.

In a case where an intensity level of a scattered wave from the medium in a detection distance range is equal to or smaller than an allowable level, a distance up to this medium is assumed to be a lower limit distance of the detection distance range. The estimation unit 5 of the signal processing device 3 includes a function of estimating the lower limit distance. The scattering reduction unit 6 includes a function of removing, from a signal of a reflected wave received by the receiver 2, a signal of a scattered wave from the medium in a masking region from the receiver 2 to the lower limit distance.

Figure 3:
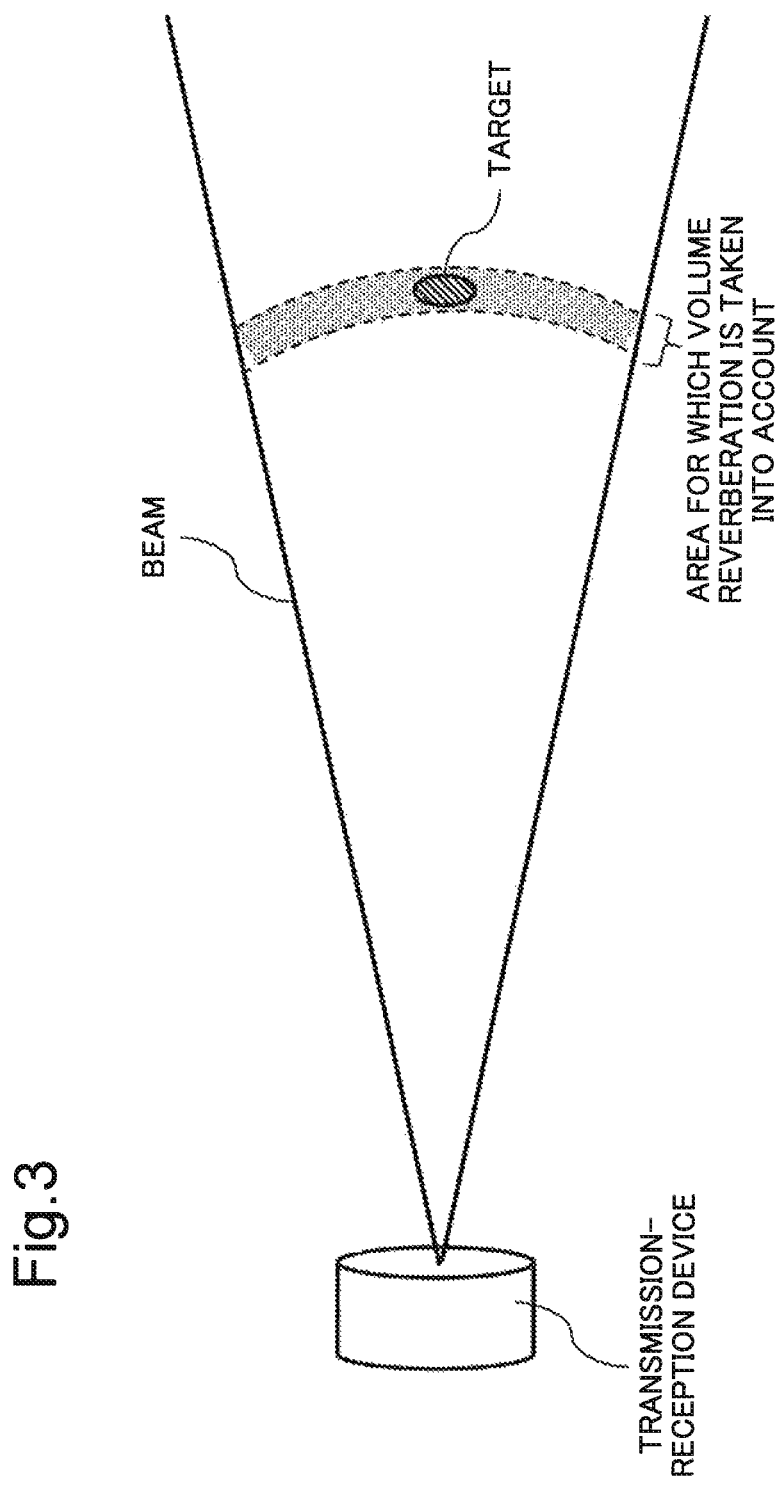
FIG. 3 is a diagram illustrating an area for which volume reverberation is taken into account for detecting a target by pulse transmission.
Figure 4:
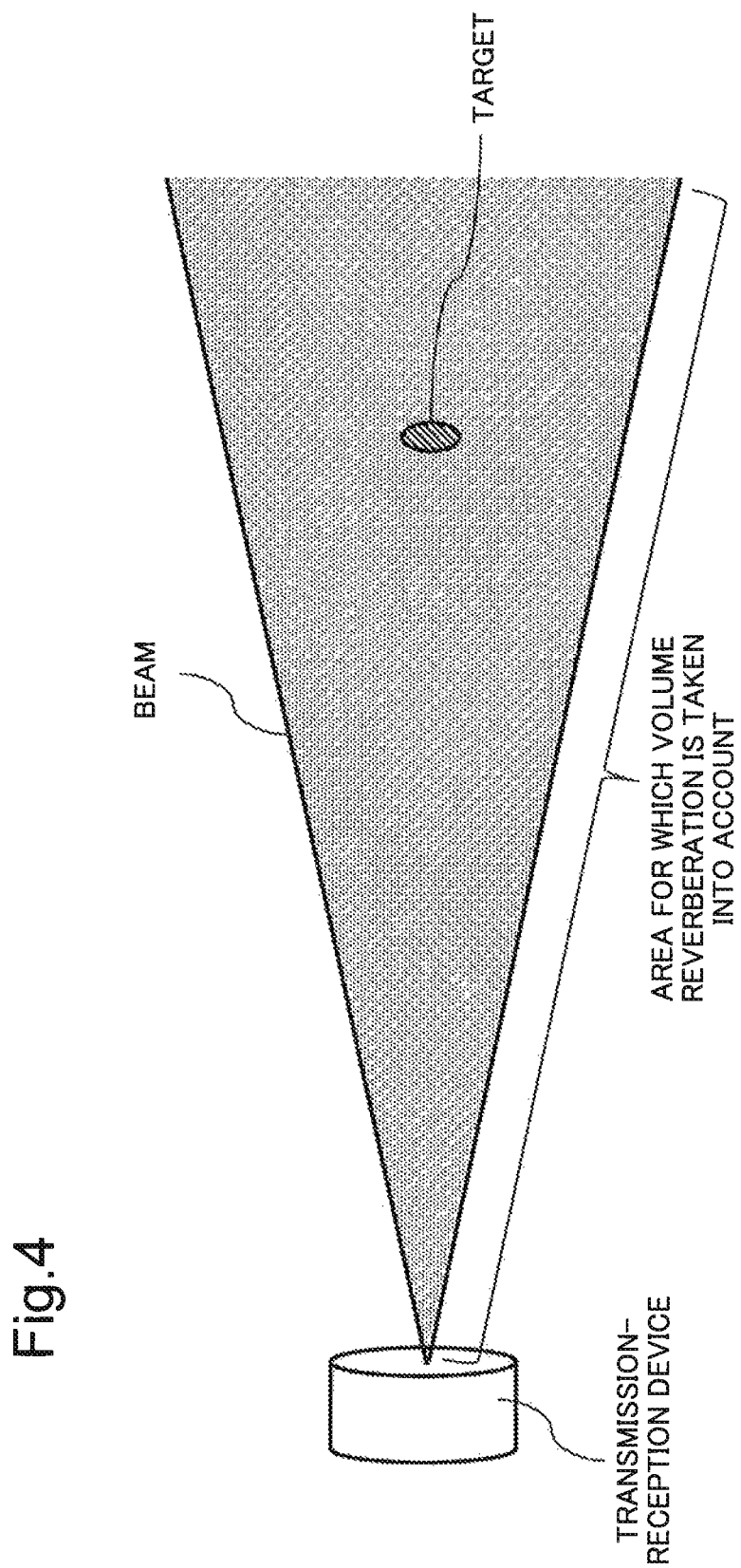
FIG. 4 is a diagram illustrating an area for which volume reverberation is taken into account for detecting a target by continuous transmission.

Here, the detection distance range and the lower limit distance in the first example embodiment will be described. FIG. 3 is a diagram illustrating an area for which volume reverberation is taken into account for detecting a target with pulse transmission. FIG. 4 is a diagram illustrating an area for which volume reverberation is taken into account for detecting a target with continuous transmission. In FIG. 3 and FIG. 4, the transmitter and the receiver are illustrated as one transmission reception device. As illustrated in FIG. 3, using pulse transmission, the area for which volume reverberation is taken into account for detecting the target is a distance range approximately equal to a distance up to a position where the target in the medium exists (e.g., the surrounding area of an arc whose radius is this distance). In contrast to this, when continuously transmitting a sound wave (FIG. 4) as in the target detection device 10 according to the first example embodiment, concerning the area for which volume reverberation is taken into account for detecting the target, reverberation (scattering) from an area other than a distance range near the target is also taken into account. A scattered wave from the medium has larger influence when a distance from the medium is short than when a distance from the medium is long. For this reason, when an intensity level of a reflected wave from the target is buried in an intensity level of a scattered wave from the medium, the detector 4 of the target detection device 10 cannot detect a target.

Figure 5:
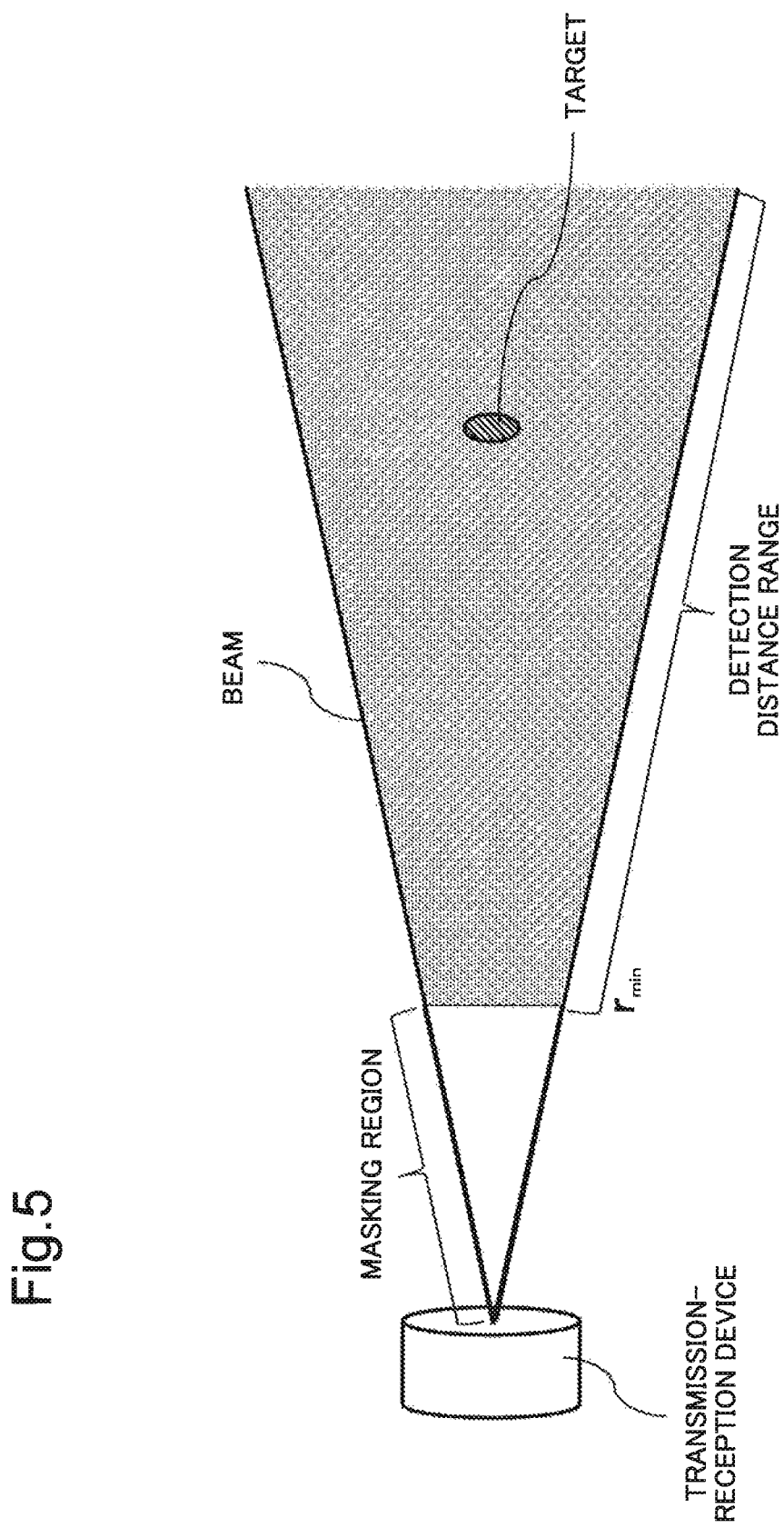
FIG. 5 is a diagram illustrating a detection distance range in the target detection device according to the first example embodiment.

FIG. 5 is a diagram illustrating a detection distance range in the target detection device according to the first example embodiment. In FIG. 5, the transmitter and the receiver are illustrated as a transmission reception device. In the target detection device 10 according to the first example embodiment, a short distance from the receiver, where a scattered wave gives large influence, is assumed to be a lower limit distance $r_{min}$, a distance range from the receiver to the lower limit distance $r_{min}$ is assumed to be a masking region, and a region positioned farther than this distance range is assumed to be the detection distance range. The estimation unit 5 of the signal processing device 3 illustrated in FIG. 1 estimates the lower limit distance $r_{min}$ for a case where an intensity level of a scattered wave from the medium in the detection distance range illustrated in FIG. 5 is equal to or smaller than an allowable level at the detector 4 of the target detection device 10. The detection distance range is a distance range where a distance from the receiver of the transmission reception device is equal to or longer than the lower limit distance $r_{min}$ illustrated in FIG. 5.

Figure 6:
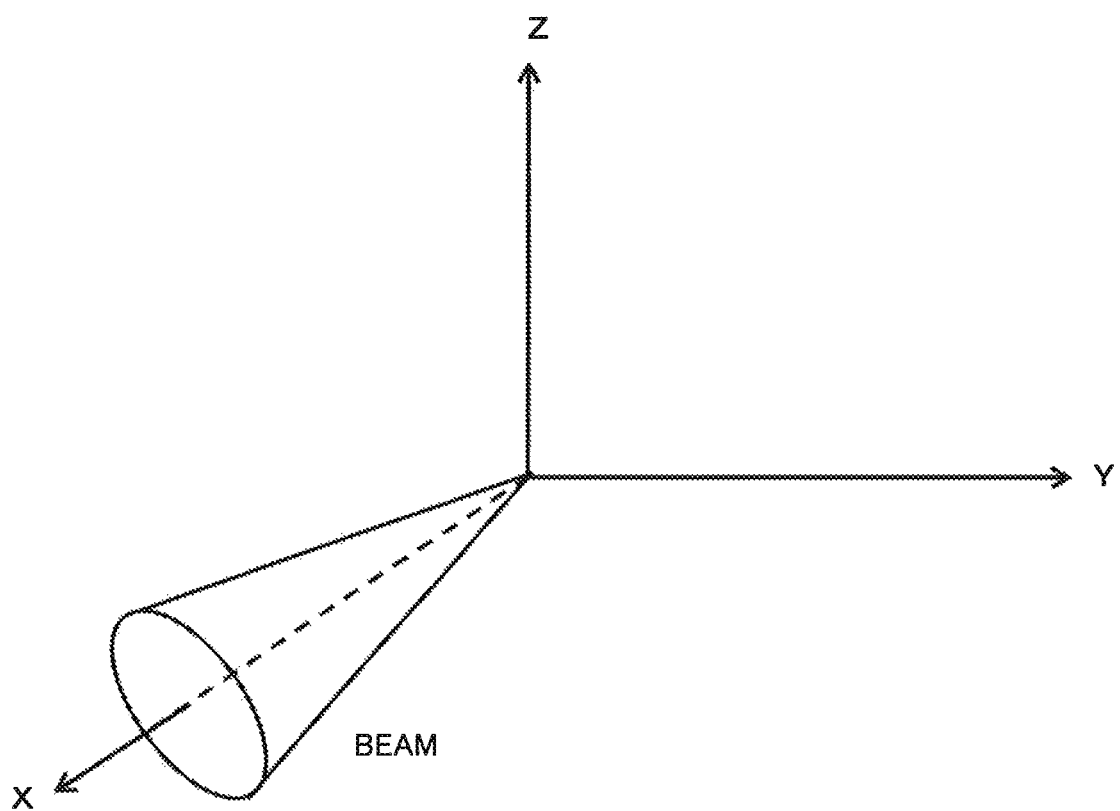
FIG. 6 is a diagram illustrating directions of a transmission beam and a reception beam in an orthogonal coordinate system.

A method of estimating a lower limit distance $r_{min}$ is described in the following. FIG. 6 is a diagram illustrating directions of a transmission beam and a reception beam in a xyz coordinate system. It is assumed that in FIG. 6, the transmitter and the receiver are arranged at the origin (0, 0, 0) of the xyz coordinates, and centers of the transmission beam and the reception beam are positioned on the x axis. It is assumed that the transmission beam and the reception beam are Gaussian beams, and the transmission beam and the reception beam have the same beam diameter.

Figure 7:
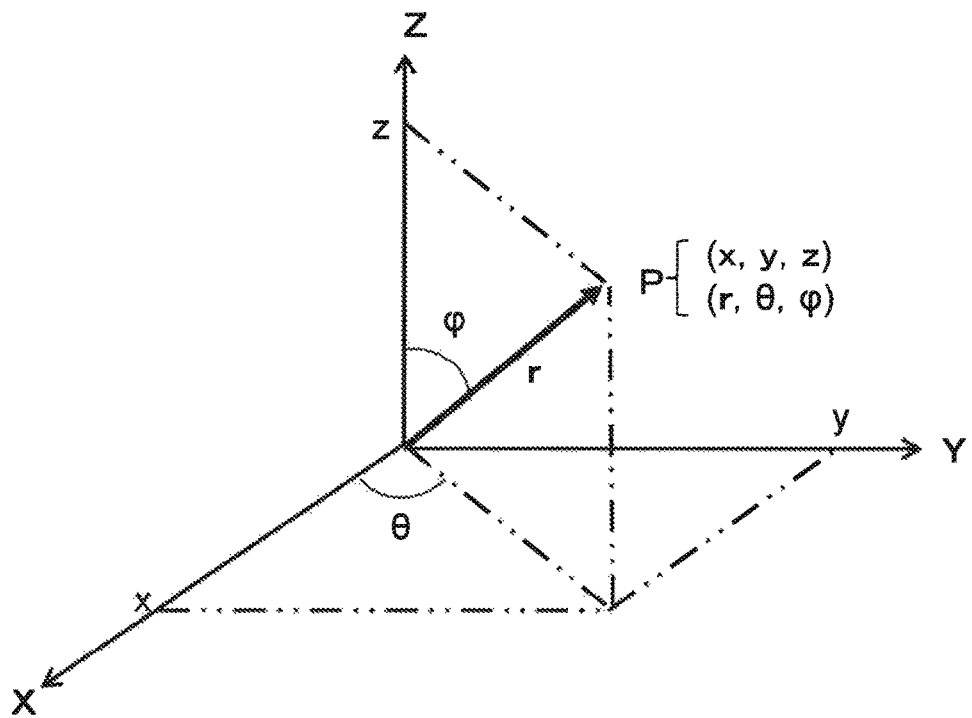
FIG. 7 is a diagram illustrating relation between an orthogonal coordinate system and a polar coordinate system.

Description is made by replacing the directions of the transmission beam and the reception beam illustrated by the orthogonal coordinate system in FIG. 6, with those in a polar coordinate system. FIG. 7 is a diagram illustrating relation between the orthogonal coordinate system and the polar coordinate system. Intensity $B_1(r,\theta,\varphi)$ and $B_2(r,\theta,\varphi)$ in the Gaussian distribution of the reception beam and the transmission beam expressed by the expression (1) and the expression (2), respectively, in the polar coordinate system.

$$B_1(r, \theta, \phi) = \exp\left\{-\frac{\phi^2}{2\sigma_\phi^2} - \frac{\left(\frac{\pi}{2} - \theta\right)^2}{2\sigma_\theta^2}\right\} \quad \text{式 Expression (1)}$$

$$B_2(r, \theta, \phi) = \exp\left\{-\frac{\phi^2}{2\sigma_\phi^2} - \frac{\left(\frac{\pi}{2} - \theta\right)^2}{2\sigma_\theta^2}\right\} \quad \text{Expression (2)}$$

(r: a distance from the origin, θ: an azimuth, φ: an angle of elevation, $\sigma_\theta$: a standard deviation of a beam diameter at a certain azimuth, $\sigma_\varphi$: a standard deviation of a beam diameter at a certain angle of elevation)

Meanwhile, it is assumed that intensity of sound on the axis at a unit distance from the transmitter 1 is $I_0$.

A minute volume at a polar coordinate $(r,\theta,\varphi)$ can be expressed as $dr \cdot rd\theta \cdot r \sin\theta d\varphi = r^2 \sin\theta dr d\theta d\varphi$. Intensity I of sound incident on this minute volume is expressed as the expression (3).

$$I = \frac{I_0 B_2(r, \theta, \phi)}{r^2} \quad \text{式 ( Expression (3)}$$

Expression of backward scattering intensity $s_v$ using decibel unit is $S_v=10 \log s_v$ ($s_v$ is also backward scattering intensity). Backward scattering intensity is a ratio of intensity of a scattered sound wave in an incident direction per a scattering layer unit volume, to an incident sound wave intensity. An intensity level of scattering at the reception point by a minute volume ($=r^2 \sin\theta dr d\theta d\varphi$) is expressed as the expression (4).

$$\frac{I_0 B_2(r, \theta, \phi) s_v r^2 \sin\theta dr d\theta d\phi}{r^4} \quad \text{式 ( Expression (4)}$$

The receiver 2 receives this by the coordinate $B_1(r,\theta,\varphi)$ of the reception beam, and for this reason, output electric power at the receiver 2 is expressed as the expression (5) (response is assumed to be 1).

$$\frac{I_0 B_1(r, \theta, \phi) B_2(r, \theta, \phi) s_v r^2 \sin\theta dr d\theta d\phi}{r^4} \quad \text{Expression (5)}$$

A scattering intensity level R in an entire region ($0 \le r \le +\infty$) can be acquired by integrating the expression (5).

$$R = \iiint_{\substack{0 \le \phi \le 2\pi \\ 0 \le \theta \le \pi \\ 0 \le r \le +\infty}} \frac{I_0 B_1(r, \theta, \phi) B_2(r, \theta, \phi) s_v r^2 \sin\theta dr d\theta d\phi}{r^4} \quad \text{Expression (6)}$$

$$= \iiint_{\substack{0 \le \phi \le 2\pi \\ 0 \le \theta \le \pi \\ 0 \le r \le +\infty}} \frac{I_0 \exp\left\{-\frac{\phi^2}{\sigma_\phi^2} - \frac{\left(\frac{\pi}{2} - \theta\right)^2}{\sigma_\theta^2}\right\} s_v \sin\theta dr d\theta d\phi}{r^2}$$

Here, a scattering intensity level R' in the detection distance range where a distance r from the transmission-reception device is a distance ($r_{min} \le r$) equal to or longer than the lower limit distance $r_{min}$ is expressed as the expression (7).

$$R' = \iiint_{\substack{0 \le \phi \le 2\pi \\ 0 \le \theta \le \pi \\ r_{min} \le r \le +\infty}} \frac{I_0 \exp\left\{-\frac{\phi^2}{\sigma_\phi^2} - \frac{\left(\frac{\pi}{2} - \theta\right)^2}{\sigma_\theta^2}\right\} s_v \sin\theta dr d\theta d\phi}{r^2} \quad \text{Expression (7)}$$

The integral as to r in the expression (7) is the expression (8).

$$\int_{r_0}^{\infty} \frac{dr}{r^2} = \left[-\frac{1}{r}\right]_{r_{min}}^{\infty} = \frac{1}{r_{min}} \quad \text{Expression (8)}$$

Here, the integral as to $\varphi$ in the expression (7) is intended to be the integral over an entire circumference concerning the beam, and is replaced with the integral from $-\pi$ to $+\pi$ since the beam having the center at $\varphi=0$ is physically symmetrical with respect to $\varphi=0$. Further, the integral over $-\pi \le \varphi < \pi$ which becomes separated from the center of an integral range is approximated as the integral over $-\infty < \varphi < \infty$ to result in the expression (9).

$$\int_0^{2\pi} \exp\left\{-\frac{\phi^2}{\sigma_\phi^2}\right\} d\phi \rightarrow \quad \text{Expression (9)}$$

$$\int_{-\pi}^{\pi} \exp\left\{-\frac{\phi^2}{\sigma_\phi^2}\right\} d\phi \approx \int_{-\infty}^{\infty} \exp\left\{-\frac{\phi^2}{\sigma_\phi^2}\right\} d\phi = \sqrt{\pi}\, \sigma_\phi$$

The integral as to $\theta$ in the expression (7) is calculated as the expression (10) by the Taylor expansion of $\theta$ in $\sin \theta$, by taking into account the terms up to the third order of $\theta$, for example.

$$\int_{-\infty}^{\infty} \exp\left\{-\frac{\left(\frac{\pi}{2} - \theta\right)^2}{\sigma_\theta^2}\right\} \sin\theta d\theta \approx \quad \text{Expression (10)}$$

$$\int_{-\infty}^{\infty} \exp\left\{-\frac{\left(\frac{\pi}{2} - \theta\right)^2}{\sigma_\theta^2}\right\} \left(\theta - \frac{\theta^3}{6}\right) d\theta =$$

$$\frac{\sqrt{\pi}\,(24\pi - \pi^3)\sigma_\theta^2 - 6\pi^{3/2}\sigma_\theta^3}{48}$$

A scattering intensity level R' in the detection distance range in the expression (7) can be expressed as the expression (11).

$$R' = \iiint_{\substack{-\infty \le \phi \le +\infty \\ -\infty \le \theta \le +\infty \\ r_{min} \le r \le +\infty}} \frac{I_0 \exp\left\{-\frac{\varphi^2}{\sigma_\phi^2} - \frac{\left(\frac{\pi}{2} - \theta\right)^2}{\sigma_\theta^2}\right\} s_v \sin\theta dr d\theta d\varphi}{r^2} \quad \text{Expression (11)}$$

$$\approx \frac{1}{r_{min}} \cdot \sqrt{\pi}\,\sigma_\phi \cdot \frac{\sqrt{\pi}\,(24\pi - \pi^3)\sigma_\theta - 6\pi^{3/2}\sigma_\theta^3}{48} \cdot I_0 s_v$$

$$= \frac{\{\pi(24\pi - \pi^3)\sigma_\phi \sigma_\theta - 6\pi^2 \sigma_\phi \sigma_\theta^3\} I_0 s_v}{48 r_{min}}$$

Since the scattering intensity level R' in the detection distance range is made equal to or smaller than a scattering intensity level $R_a$ allowable for the detector in the target detection device, the allowable scattering intensity level $R_a$ can be expressed as the expression (12), by using the lower limit distance $r_{min}$.

$$R_a \ge R' \approx \frac{\{\pi(24\pi - \pi^3)\sigma_\phi \sigma_\theta - 6\pi^2 \sigma_\phi \sigma_\theta^3\} I_0 s_v}{48 r_{min}} \quad \text{Expression (12)}$$

Accordingly, $r_{min}$ that is the lower limit distance of the detection distance range can be calculated by using $\sigma_\phi$, $\sigma_\theta$, $I_0$, $s_v$, and $R_a$ represented in the expression (13).

$$r_{min} \ge \frac{\{\pi(24\pi - \pi^3)\sigma_\phi \sigma_\theta - 6\pi^2 \sigma_\phi \sigma_\theta^3\} I_0 s_v}{48 R_a} \quad \text{Expression (13)}$$

The estimation unit 5 can estimate an accurate lower limit distance $r_{min}$ by taking into account an absorption loss in the medium at the time of acquiring the lower limit distance $r_{min}$.

The scattering reduction unit 6 removes, from scattering from the medium from which the receiver 2 receives a wave, scattering from the medium in the masking region where a distance r from the receiver 2 satisfies $0 \le r \le r_{min}$. Thereby, when the detector 4 at a subsequent stage detects a target, an intensity level R' of scattering from the medium where a wave propagates in the detection distance range becomes equal to or smaller than the allowable scattering intensity level Ra.

Scattering from the medium in the masking region ($0 \le r \le r_{min}$) is distinguished by varying a modulation condition between for the detection distance range having the lower limit distance $r_{min}$ and for the masking region. For example, the scattering reduction unit 6 can perform the distinguishing from the intensity level R' of scattering from the detection distance range by using linear frequency modulation (LFM). Since a frequency of a transmission wave by the LFM is modulated to be in proportion to time, it is assumed that a frequency at the time t=0 is f=$f_0$, and a transmission wave transmitted at the preceding time t=$t_1$ by a frequency of f=$f_1$ arrives at $r_{min}$. In this case, the scattering reduction unit 6 can remove scattering in a range of $0 \le r \le r_{min}$ by removing a reflected wave having a frequency in a range of $f_1 \le f \le f_0$.

Although the description is made above by using the LFM as an example of varying a modulation condition in order to remove scattering from the medium in the masking region, a different frequency modulation may be used. Scattering from the medium in the masking region can be removed also by using different modulation information such as phase modulation or amplitude modulation other than frequency modulation.

Figure 2:
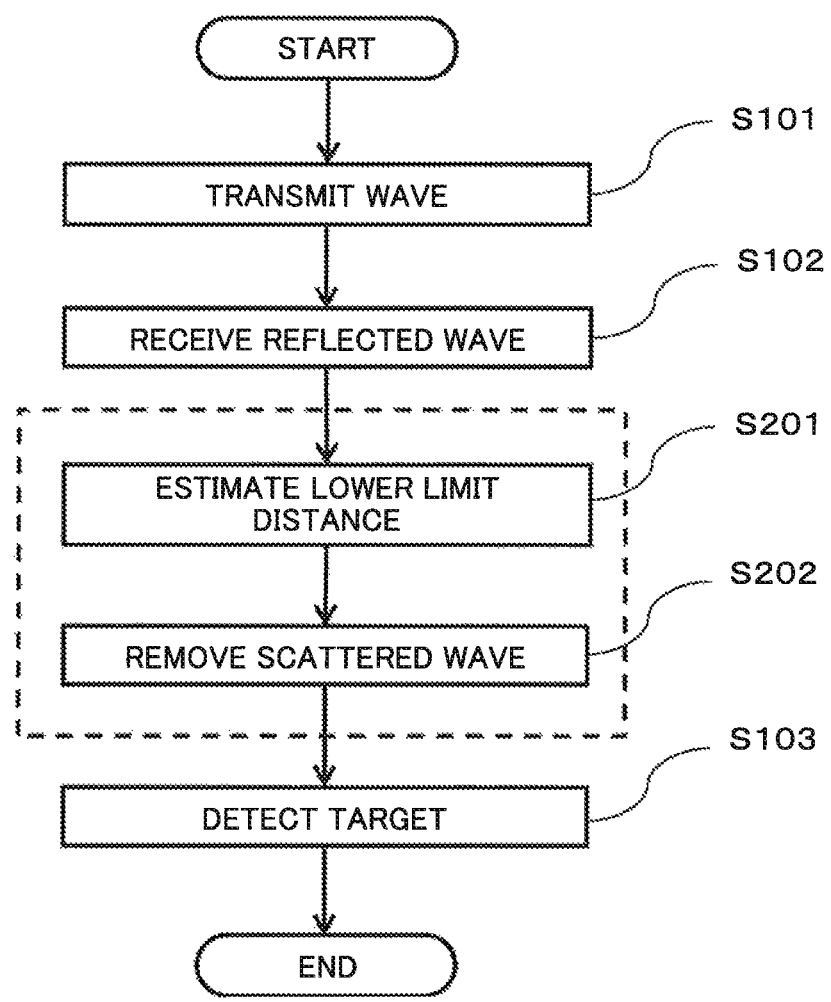
FIG. 2 is a flowchart illustrating operation of the target detection device according to the first example embodiment.

Next, operation of the target detection device according to the first example embodiment is described by using the drawing. FIG. 2 is a flowchart illustrating operation of the target detection device according to the first example embodiment. As illustrated in FIG. 1 and FIG. 2, the transmitter 1 of the target detection device 10 continuously transmits a sound wave (a wave) toward a target in the water (S101). Next, the receiver 2 of the target detection device 10 receives a reflected wave that a sound wave propagating through the water reflects in the medium (S102). The reflected wave reflected in the medium also includes a scattered wave from the medium, besides a reflected wave from the target in the medium.

Next, based on an output from the receiver 2 that has received the reflected wave reflected in the medium, the signal processing device 3 of the target detection device 10 removes an output of a scattered wave from the medium in the masking region to thereby reduce influence of scattering from the medium.

Specifically, the estimation unit 5 of the signal processing device 3 estimates a lower limit distance of a detection distance range for which an intensity level of a scattered wave from the medium in the detection distance range is equal to or smaller than an allowable level (S201). Further, the scattering reduction unit 6 of the signal processing device 3 removes, from a signal of the reflected wave received by the receiver 2, a signal of the scattered wave from the medium in the masking region from the receiver 2 to the lower limit distance (S202), and performs output.

Based on the output from the signal processing device 3, the detector 4 of the target detection device 10 then detects the target in the water.

The target detection device in the first example embodiment is described above by citing an example of using a sound wave as a wave, but without limitation to this, a wave such as a radio wave or a light wave can be used.

(Advantageous Effect of First Example Embodiment)

According to the signal processing device of the first example embodiment, when a wave is continuously transmitted to detect a target, influence of scattering from the medium can be reduced. According to the target detection device of the first example embodiment, reduction in influence of scattering from the medium facilitates detection of a target in the medium.

(Hardware Configuration)

Figure 8:
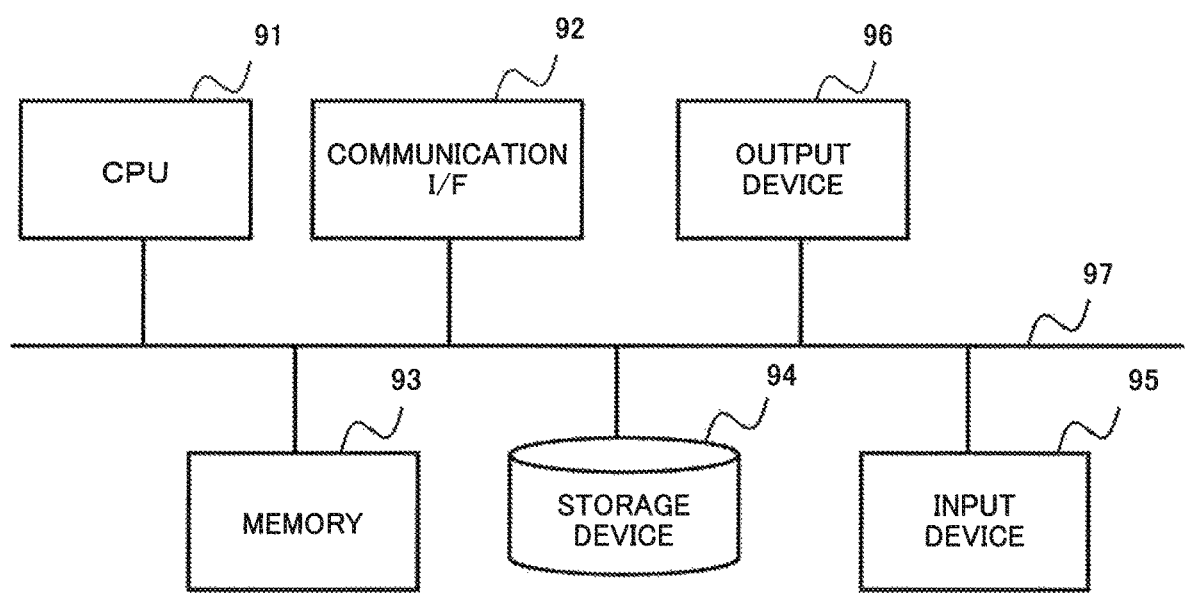
FIG. 8 is a block diagram illustrating a hardware configuration of the signal processing device.

FIG. 8 is a diagram illustrating a hardware configuration for implementing, with a computer device, a signal processing device according to the first example embodiment. The signal processing device 3 is configured by hardware including a central processing unit (CPU) 91, a communication interface (communication I/F) 92 for network connection, a memory 93, and a storage device 94 such as a hard disk storing a program. The CPU 91 is coupled to an input device 95 and an output device 96 via a system bus 97.

The CPU 91 causes an operating system to operate to execute predetermined processes in the estimation unit 5 and the scattering reduction unit 6 of the signal processing device 3 according to the first example embodiment. The CPU 91 reads out a program and data to the memory 93 from a recording medium attached to a drive device, for example. The CPU 91 includes a function of processing an information signal input from the receiver 2 and the like, and executes processes of various functions, based on the program, for example.

The storage device 94 is an optical disk, a flexible disk, a magneto-optical disk, an external hard disk, a semiconductor memory, or the like, for example. A storage medium that is a part of the storage device 94 is a nonvolatile storage device, and a program is stored therein. The program may be downloaded from an external computer not illustrated, coupled to a communication network.

The input device 95 is implemented by a mouse, a keyboard, built in key buttons, a touch panel, or the like, and is used for input operation. The output device 96 is implemented by, for example, a display, and is used for outputting and confirming information processed by the CPU 91, or the like.

As described above, the signal processing device 3 according to the first example embodiment is implemented by the hardware configuration illustrated in FIG. 8. The signal processing device 3 may be implemented by one physically integrated device, or may be implemented by a plurality of devices with these two or more physically separated devices being coupled wirelessly or through a wired line.

Although the disclosed subject matter is described above with reference to the example embodiments (and the examples), the disclosed subject matter is not limited to the above described example embodiments (and the examples). Various modifications that can be understood by those skilled in the art can be made on a configuration and details of the disclosed subject matter, within the scope of the disclosed subject matter.

The present application claims priority based on Japanese Patent Application No. 2015-029224 filed on Feb. 18, 2015, entire disclosure of which is incorporated herein.

REFERENCE SIGNS LIST

1 Transmitter
2 Receiver
3 Signal processing device
4 Detector
5 Estimation unit
6 Scattering reduction unit
10 Target detection device
91 CPU
92 Communication I/F (communication interface)
93 Memory
94 Storage device
95 Input device
96 Output device
97 System bus

What is claimed is:

1. A target detection device comprising:
   a transmitter configured to transmit continuously a wave propagating through a medium;
   a receiver configured to receive a reflected wave that comprises the wave reflected in the medium and a scattered wave from the medium;
   a signal processing device configured to estimate a lower limit distance of a detection distance range for which an intensity level of the scattered wave from the medium in the detection distance range is equal to or smaller than an allowable level, and remove, from a signal of the reflected wave received by the receiver, a signal of the scattered wave from the medium in a masking region from the receiver to the lower limit distance to perform output; and
   a detector configured to detect a target in the medium, based on an output from the signal processing device.

2. The target detection device according to claim 1,
   wherein the transmitter performs frequency modulation, phase modulation, or amplitude modulation to transmit the wave, and
   based on modulation information of the reflected wave received by the receiver, wherein the signal processing device removes, from the signal of the reflected wave received by the receiver, the signal of the scattered wave from the medium in the masking region.

3. The target detection device according to claim 1, wherein the transmitter transmits the wave the wave by linear frequency modulation.

4. The target detection device according to claim 1, wherein the wave transmitted by the transmitter is one of a sound wave, a radio wave, and a light wave.

5. A target detection method comprising:
   continuously transmitting a wave propagating through a medium;
   receiving a reflected wave that comprises the wave reflected in the medium and a scattered wave from medium;
   estimating a lower limit distance of a detection distance range for which an intensity level of the scattered wave from the medium in the detection distance range is equal to or smaller than an allowable level;
   removing, from a signal of the reflected wave received, a signal of the scattered wave from the medium in a masking region from a receiver to the lower limit distance to perform output; and
   detecting a target in the medium, based on the output.

6. A non-transitory computer-readable recording medium storing a detection program that causes a computer to execute:
   continuously transmitting a wave propagating through a medium;
   receiving a reflected wave that comprises the wave reflected in the medium and a scattered wave from the medium;
   estimating a lower limit distance of a detection distance range for which an intensity level of a scattered wave from the medium in the detection distance range is equal to or smaller than an allowable level;
   removing, from a signal of the reflected wave received, a signal of the scattered wave from the medium in a masking region from a receiver to the lower limit distance to perform output; and
   detecting a target in the medium, based on the output.

7. A signal processing device for processing a signal of a reflected wave that comprises a wave reflected in a medium and a scattered wave from the medium, and is received by a receiver, when the wave propagating through the medium is continuously transmitted from a transmitter, the signal processing device comprising:
   a memory storing instructions; and
   at least one processor configured to process the instructions to:
      estimate a lower limit distance of a detection distance range for which an intensity level of the scattered wave from the medium in the detection distance range is equal to or smaller than an allowable level; and
      remove, from a signal of the reflected wave received, a signal of the scattered wave from the medium in a masking region from the receiver to the lower limit distance to perform output.

8. The target detection device according to claim 2, wherein the transmitter transmits the wave by linear frequency modulation.

9. The target detection device according to claim 2, wherein the wave transmitted by the transmitter is one of a sound wave, a radio wave, and a light wave.

* * * * *